(No Model.)

C. M. CONRADSON.
AUTOMATIC CHUCK AND ROD FEEDER.

No. 490,863. Patented Jan. 31, 1893.

Witnesses:
James F. Duhamel
Horace A. Dodge.

CONRAD M. CONRADSON
Inventor:
by Dodge Sons,
Attys.

UNITED STATES PATENT OFFICE.

CONRAD M. CONRADSON, OF MADISON, WISCONSIN.

AUTOMATIC CHUCK AND ROD-FEEDER.

SPECIFICATION forming part of Letters Patent No. 490,863, dated January 31, 1893.

Application filed March 18, 1892. Serial No. 425,390. (No model.)

*To all whom it may concern:*

Be it known that I, CONRAD M. CONRADSON, a citizen of the United States, residing at Madison, in the county of Dane and State of Wisconsin, have invented certain new and useful Improvements in Automatic Chucks and Rod-Feeders, of which the following is a specification.

My invention relates to devices designed more particularly for feeding the stock or material in screw-cutting lathes, but the improvements are applicable to other classes of work.

Figure 1:
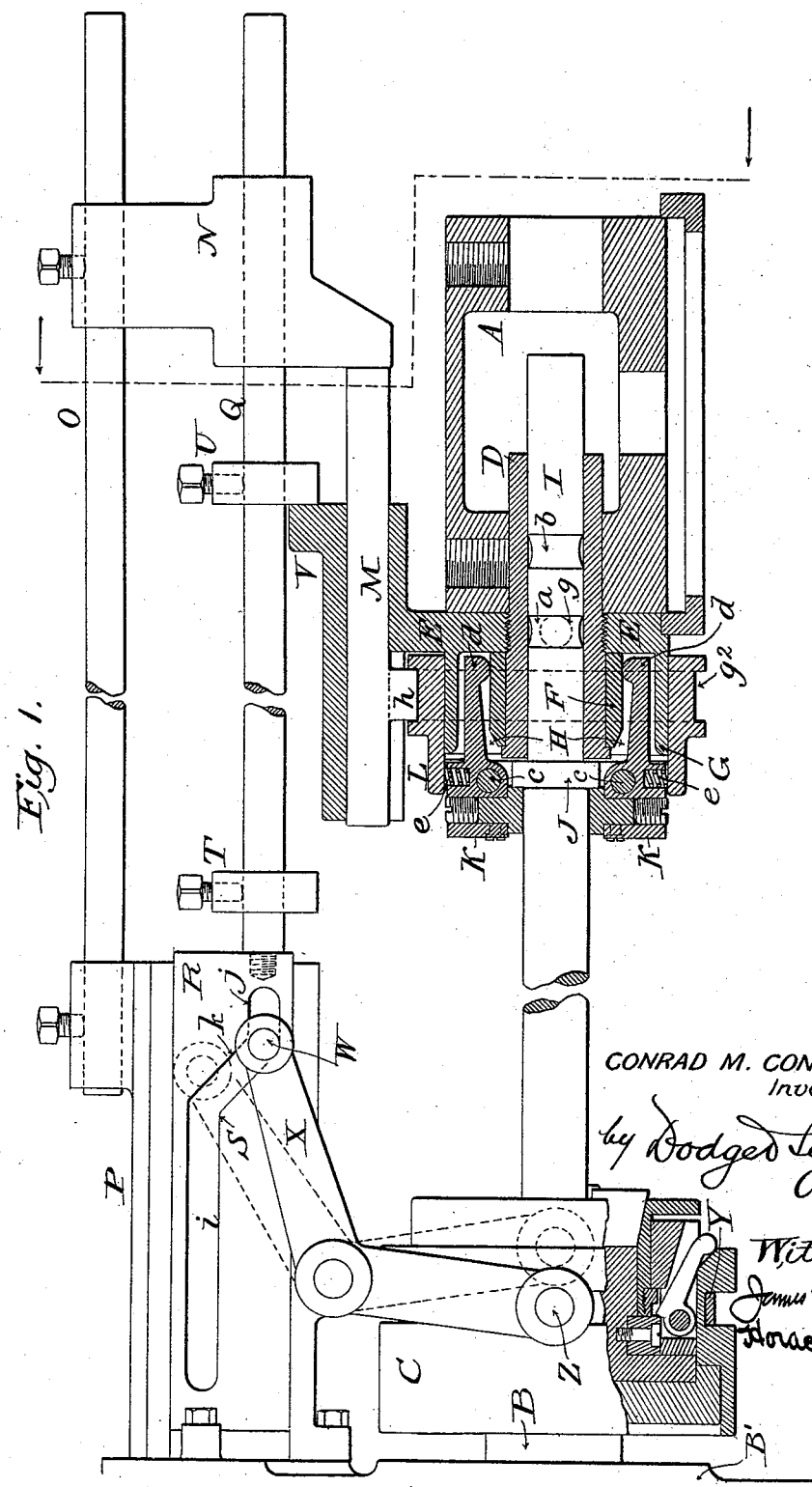
Figure 2:
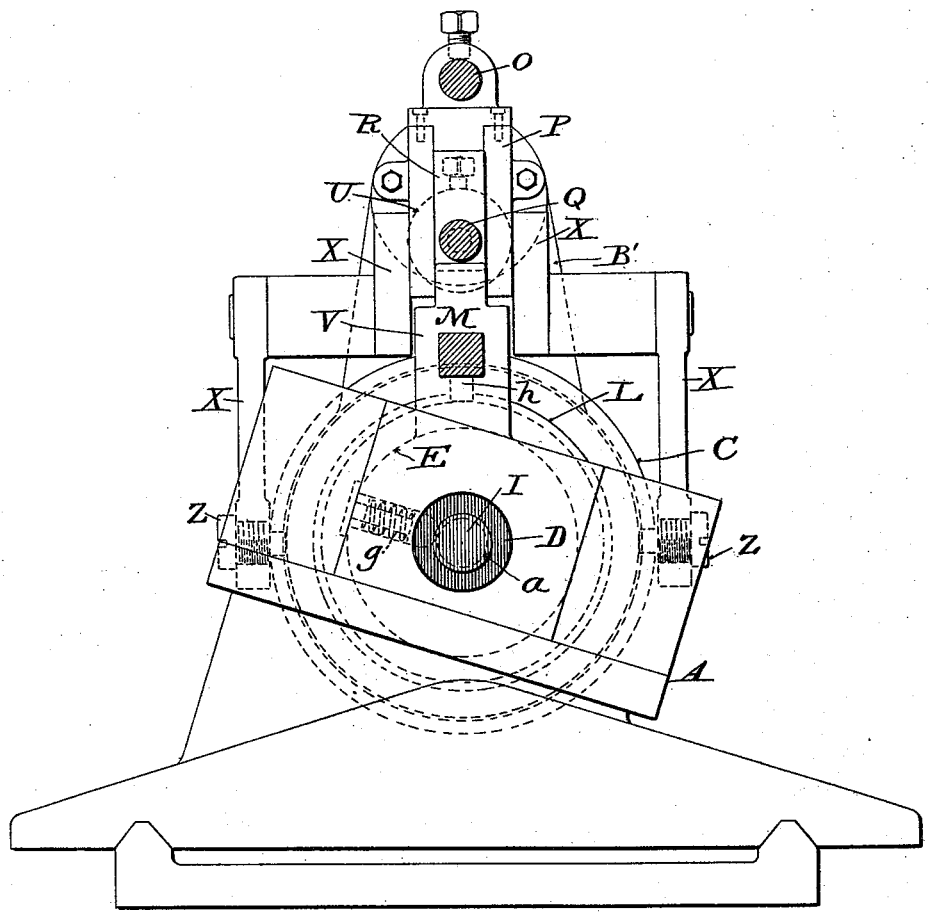
Figure 3:
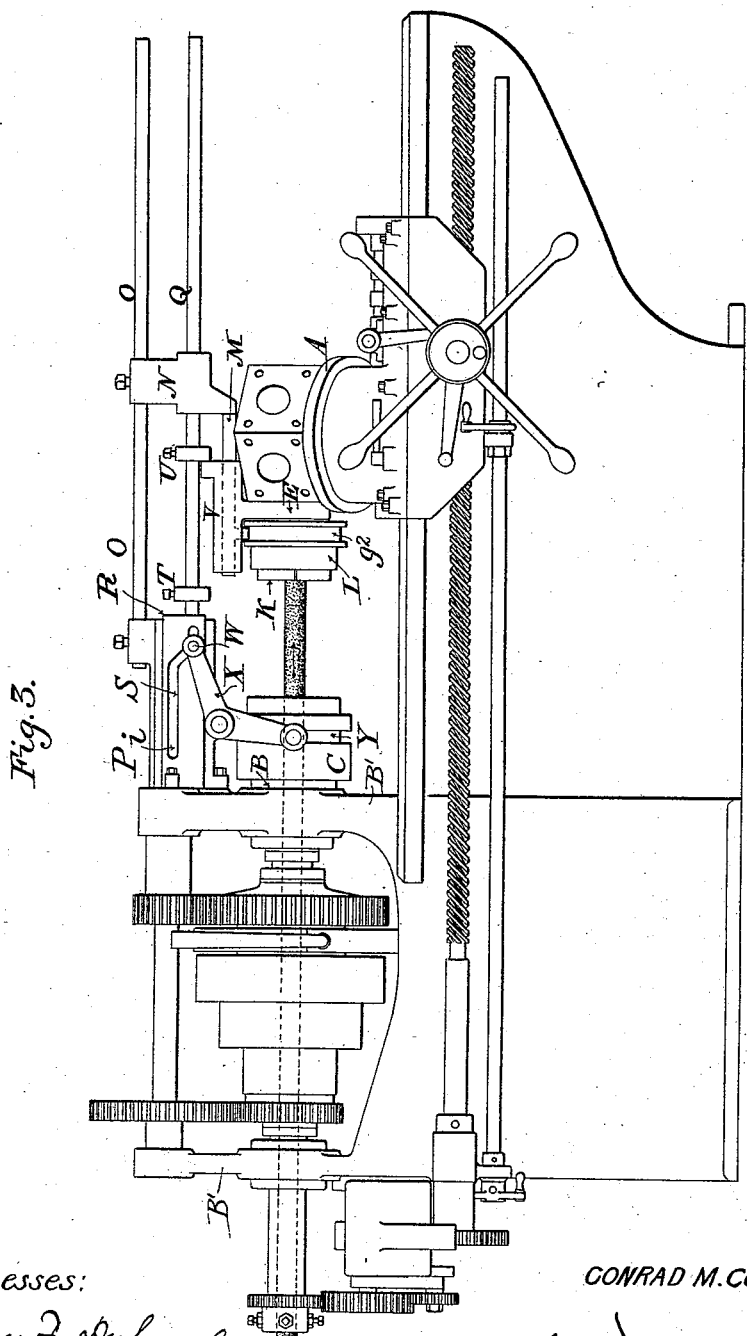

In the accompanying drawings,—Figure 1 is a side elevation partly in section, showing my improvements applied to a turret lathe; Fig. 2, an end elevation of the same, and Fig. 3 a side elevation of a turret lathe having my improvements applied thereto.

A indicates the turret of the lathe, B the hollow arbor or mandrel carried in the head stock, B′, and C the chuck secured to said hollow arbor or mandrel, all of which parts may be of ordinary construction except as hereinafter particularly noted.

The form of chuck which I have shown in Fig. 1 is that described and claimed in my pending application Serial No. 430,985. This form of chuck is shown herein merely for the purposes of illustration, it being distinctly understood that the present invention is not restricted to the employment of this or any other form or style of chuck.

Mounted in one of the openings of the turrets is a sleeve or collar D which screws through a central opening in a circular plate E, as clearly shown in Fig. 1. The outer end of the tube or sleeve D is provided with a lateral flange, and between this flange and the outer face of the plate E and surrounding the tube is a collar F whose forward edge is beveled slightly, as also shown in said figure.

The plate E to which I have before referred, is provided with a circumferential rim or flange G concentric with the collar F, but separated a distance therefrom so as to form an annular chamber or space H between said collar F and the rim or flange G.

Mounted within the tube or sleeve D is a spindle or shaft I which is provided with two circumferential grooves $a$ and $b$, and with a head J at its outer end, in which are pivoted the clamping jaws or levers K, K. These levers are each pivoted upon a pin or stud $c$, and each has a tail or extension $d$, which projects rearwardly into the annular space H before referred to, and clearly shown in Fig. 1. In rear of the axes of these levers or jaws K, each of them is provided with a spring $e$, which tends to keep their active clamping faces away from the work to be clamped or held. It will be noticed upon reference to Fig. 1 that these springs are mounted each in a socket in the outer face of the levers K and bear at their outer ends against the inner face of the band or shell L, which encircles the flange G of the plate E.

The stem or shaft I which carries the jaws or levers K is held in the position shown in Fig. 1 by means of a spring-pressed pin $g$ shown in dotted lines in Figs. 1 and 2, which enters the circumferential groove $a$ in the said shaft. The nose of this pin is rounded so as to permit the shaft to be pulled outward to bring the second circumferential groove $b$ opposite the pin, whereupon the spring-pressed pin will enter the groove $b$ and prevent the rod from moving outward accidentally. As the shaft or stem I is thus pulled outward, the tails $d$ of the levers K ride down the inclined or beveled nose of the collar F, and their springs tip or rock the said levers slightly so as to cause the jaws to release their hold upon the rod to be clamped or grasped. When the shaft or stem I is pushed inward to the position shown in Fig. 1, the tails of the levers riding up the inclined edge of the collar F on to the enlarged portion of the latter will cause the levers to rock or tip and their jaws to bite firmly upon the rod and thus permit the levers to firmly grasp the rod or stock. The encircling band or shell L is designed to move inward and outward with the shaft I and its jaws, so that the springs $e$ may have at all times a bearing at their outer ends against the inner face of the band or shell.

It will be noticed upon reference to Fig. 1 that the band or shell is grooved circumferentially as at $g^2$ to receive a downwardly projecting arm $h$ of a rod M, which latter is mounted in an upward extension V of the plate E as shown in Figs. 1 and 2. This rod M which moves inward and outward with reference to the plate E as the band is moved, is designed to come in contact with a stop or block N which is adjustably secured upon a rod O projecting from a bracket P secured to the head-stock of the machine. Directly beneath the rod O and above the rod M is a third rod Q which passes at one end through the block N and carries at its opposite end a plate R having a cam slot S comprising two straight portions *i* and *j* and an inclined connecting portion *k*, as shown in Fig. 1.

Mounted upon the rod Q are adjustable collars T and U, which are designed to strike the upward extension V of the plate or casting E. Working within the cam-slot S is a cross-pin W, which is carried at the upper end of a pair of elbow or bell crank levers X which are pivoted to the under side of the bracket P,—the lower arms of said levers X being provided with a ring Y which encircles the chuck-body, and which is pivotally connected to the bell crank levers by the studs or journals Z, the construction and arrangement being such that as the rod Q is moved outward or to the right it will cause the bell crank levers to rock or move, and to be brought to the position shown by the dotted lines in Fig. 1, and to thereby actuate the chuck-jaws. When the rod Q moves to the left or in the reverse direction from that just alluded to, the bell crank levers will assume the position represented by the full lines in Fig. 1.

Now when it is desired to feed stock through the hollow arbor and the chuck mounted thereon, the bar or rod to be fed is first passed through the hollow spindle or arbor with the end projecting beyond the face of the chuck. The spindle I with attached parts should now be moved outward longitudinally with reference to the bushing or tube D whereupon the jaws of the levers will be separated or opened. The gripping devices are now moved up toward the rod to be grasped, and the jaws of the levers pass upon the end of the bar until arrested by the end of the bar coming in contact with the front face of the spindle I. Continuing the movement alluded to, the spindle will be pushed into the bushing or sleeve D and the tails of the levers riding up the inclined edge of the collar F will force the jaws of levers K firmly upon the rod so as to clamp the latter. By the time that the levers clamp the rod firmly the groove *a* of the spindle will pass under the spring-pin *g*, which immediately locks the spindle and bushing against further independent longitudinal movement. When this has been accomplished the gripping devices and the turret or other parts to which they are secured are moved backward bodily drawing with them the rod or bar. During these operations, the bar remains unclamped within the chuck on the hollow arbor, but when a sufficient length of rod has been fed through the arbor and chuck, the upward extension V of the plate or casting E strikes the collar U and carries the rod Q rearwardly and draws with it the cam-plate R.

As the cam-plate thus moves outwardly, the inclined portion of the cam-slot acting upon the bell crank levers operates the chuck jaws so as to clamp the rod which is being drawn through said chuck and thereby prevents any further movement of the rod through the latter. Work may now be done upon the rod or bar Z while held at both ends. Or if desired, the turret may be moved backward still farther so as to release the levers K and their jaws, and the rod operated upon, while held only by the chuck-jaws. When work is done upon the rod or bar while held by the jaws or levers K, the latter turn or rotate with the work, the spindle I rotating within the bushing and the tails of the levers turning or rotating within the annular space H on the outer face of the plate or casting E. The stop U upon the rod Q, in connection with the upward extension V of the plate E, determines the length of the stock fed through the hollow arbor, and is consequently a feature of the utmost importance. When the rod gripping devices are moved outward from the turret, the upward extension V, striking the collar T, carries the cam plate inward, but upon the backward movement of the plate E, its upward extension V will strike the collar U and move the cam plate outwardly so that by the time the parts are in the position shown in Fig. 1, the cam plate will have been moved in the manner and to such extent as to cause the jaws of chuck C to firmly grip the rod. By varying the distance between the collars T and U upon the rod or shaft Q, the length of rod or stock through the hollow arbor, may be accurately determined, thus insuring a uniformity in the feed.

I am aware that a machine has been patented in which there is a set of running rod-supplying spindles mounted in a frame, in connection with a step-by-step rotating tool holder having a reciprocating movement toward and from the stock supplying spindles, and to such a machine I make no claim.

Having thus described my invention, what I claim is:—

1. In combination with a stationary head stock, a hollow arbor journaled therein and provided with a chuck, the jaws of which are actuated by the movements of the gripping devices, and a turret or tool holder provided with the said rod gripping devices and movable toward and from the chuck.

2. In combination with the stationary head stock, the hollow arbor journaled therein and provided with a chuck, a gripping device movable toward and from the chuck and adapted to take hold of the work and draw or feed it through the chuck, and mechanism for actuating the chuck jaws controlled by the movements of the gripping device, substantially as shown and described.

3. In combination with the stationary head stock the hollow arbor journaled therein and provided with a chuck, a gripping device movable toward and from the chuck, and intermediate connections between the gripper and the chuck whereby when the gripper is moved to draw the stock through the arbor the chuck jaws shall be automatically released.

4. In combination with the stationary head stock, the hollow arbor journaled therein and provided with a chuck, a gripping mechanism movable toward and from the same, and means substantially such as shown and described controlled by the movements of the gripping mechanism for automatically causing the chuck jaws to grasp and to release the rod or stock.

5. In combination with the hollow arbor, a chuck secured thereto, a reciprocating cam plate and connections for actuating the chuck jaws, a rod for said cam plate provided with stops T and U, and a rod-gripping device movable toward and from the chuck and designed to engage the stops.

6. In combination with the hollow arbor, a chuck, the bell crank levers for actuating the chuck, plate R provided with the cam slot S, to receive the pin W of the levers, a rod Q for the cam plate provided with the stops T U, and a rod gripping device movable toward and from the chuck and adapted to engage the stops.

7. In combination with the hollow arbor, a chuck, the bell crank levers X provided with a pin W, bracket P, plate R mounted on the bracket and provided with a cam slot S (having straight portions $i\,j$ and inclined portion $k$) to receive the pin W, a rod Q provided with stops T U, and a rod gripping device movable toward and from the chuck and provided with an upward extension V to engage the stops.

8. In combination with the hollow arbor, a chuck, the bell crank levers X provided with a pin W, bracket P, plate R mounted on the bracket and provided with a cam slot S (having straight portions $i\,j$ and inclined portion $k$) to receive the pin W, a rod Q provided with stops T U, a rod gripping device movable toward and from the chuck and provided with an upward extension V to engage the stops, a rod M carried by and movable relatively to the rod gripping devices, a support O, and a stop N carried by the support, to engage the rod M.

9. In combination with bushing D, spindle I provided with head J and gripping jaws or levers K, a plate E provided with circular flange G, a collar F encircling the bushing, a band or shell L encircling the flange G, and a spring $e$ for each lever bearing against the inner face of the shell L and serving to hold the jaws or levers normally off the rod or stock.

10. In combination with the hollow arbor and chuck, the bell crank levers, and the rod for actuating the same, the rod gripping devices having the sliding grooved shell L, the rod M provided with the arm $h$ to enter the groove, and the stop N for the rod M.

11. In combination with the hollow arbor, a chuck, the jaws of which are actuated by the movements of gripping devices, a turret or tool holder provided with the said rod gripping devices and movable toward and from the chuck, and stops with which said rod gripping devices are designed to come into engagement and thereby determine the point at which the chuck jaws shall be actuated.

12. In combination with the hollow arbor and its chuck, a gripping device movable toward and from the chuck and adapted to take hold of the work and draw or feed it through the chuck, mechanism for actuating the chuck jaws controlled by the movements of the gripping device, and adjustable stops by means of which the chuck operating mechanism may be brought into and out of action at a point sooner or later in the travel of the rod gripping devices.

13. In combination with a hollow arbor and its chuck C, a rod Q and intermediate connections substantially such as shown, for actuating the chuck jaws, adjustable collars T and U secured upon said rod Q, and a rod gripping device movable toward and from the chuck and adapted to engage the collars T and U, all substantially as shown and described.

14. In combination with a hollow arbor and its chuck C, a rod Q and intermediate connections substantially such as shown, for actuating the chuck jaws, adjustable collars T and U secured upon said rod Q, a rod gripping device movable toward and from the chuck and adapted to engage the collars T and U, and a rod M, carried by the rod gripping devices and adapted to come into engagement with a fixed stop N, substantially as and for the purpose set forth.

15. In combination with the hollow arbor, a chuck the jaws of which are actuated by the movements of the gripping devices, a turret or tool holder provided with the said rod gripping devices and movable toward and from the chuck, and two stops with which said rod gripping devices are adapted to come into engagement, one of said stops being designed to determine the point at which the jaws of the chuck shall be actuated, while the other determines the point at which the rod gripping devices shall be released.

In witness whereof I hereunto set my hand in the presence of two witnesses.

CONRAD M. CONRADSON.

Witnesses:
JOHN T. LYDON,
W. R. BAGLEY.